US007086848B2

(12) United States Patent
Bischer et al.

(10) Patent No.: US 7,086,848 B2
(45) Date of Patent: Aug. 8, 2006

(54) PLASTIC CONTAINER INJECTION-MOULDING MACHINE EQUIPPED WITH QUICK MOULD-CHANGE ARRANGEMENT

(75) Inventors: Luigino Bischer, Conegliano (IT); Paolo Fugolo, Treviso (IT); Matteo Zoppas, Pordenone (IT)

(73) Assignee: SIPA S.p.A., Vittorio Veneto (IT)

( * ) Notice: Subject to any disclaimer, the term of this patent is extended or adjusted under 35 U.S.C. 154(b) by 376 days.

(21) Appl. No.: 10/257,442

(22) PCT Filed: Mar. 3, 2001

(86) PCT No.: PCT/EP01/02425

§ 371 (c)(1),
(2), (4) Date: Jan. 27, 2003

(87) PCT Pub. No.: WO01/78959

PCT Pub. Date: Oct. 25, 2001

(65) Prior Publication Data

US 2004/0084807 A1 May 6, 2004

(30) Foreign Application Priority Data

Apr. 11, 2000 (IT) .......................... PN2000A0022

(51) Int. Cl.
*B29C 45/17* (2006.01)
(52) U.S. Cl. .................. 425/192 R; 425/468; 425/577; 264/39; 29/426.2
(58) Field of Classification Search ................ 425/153, 425/468, 574, 575, 577, 509, DIG. 10, 192 R; 264/39; 29/402.03, 426.2
See application file for complete search history.

(56) References Cited

U.S. PATENT DOCUMENTS

| 3,650,650 | A | | 3/1972 | Cook, Jr. |
| 4,571,171 | A | | 2/1986 | Blank et al. |
| 5,051,227 | A | * | 9/1991 | Brun et al. .................. 264/537 |
| 5,198,249 | A | * | 3/1993 | Westerkamp ............... 425/589 |
| 5,417,913 | A | * | 5/1995 | Arend ...................... 264/328.1 |
| 5,736,173 | A | * | 4/1998 | Wright et al. ............... 425/577 |
| 6,139,305 | A | * | 10/2000 | Nesch ........................ 425/130 |

OTHER PUBLICATIONS

Patent Abstracts of Japan, vol. 14, No. 319 (M-996), Jul. 9, 1990 & JP 02 107418 A (Nakagawa Electric Ind Co Ltd), Apr. 19, 1990.
Patent Abstracts of Japan, vol. 5, No. 203 (M-103), Dec. 23, 1981 & JP 56 119700 A (Yamaha Hatsudoki KK), Sep. 19, 1981.

* cited by examiner

*Primary Examiner*—Robert Davis
*Assistant Examiner*—Veronica Ewald
(74) *Attorney, Agent, or Firm*—Wenderoth, Lind & Ponack, L.L.P.

(57) ABSTRACT

An injection molding machine and method of injection molding is provided, in which an upper platen, a moving platen, and a cavity-carrying platen are used. A removable member (cylinder) is provided to limit travel of the moving platen towards the cavity-carrying platen and to support the moving platen.

13 Claims, 11 Drawing Sheets

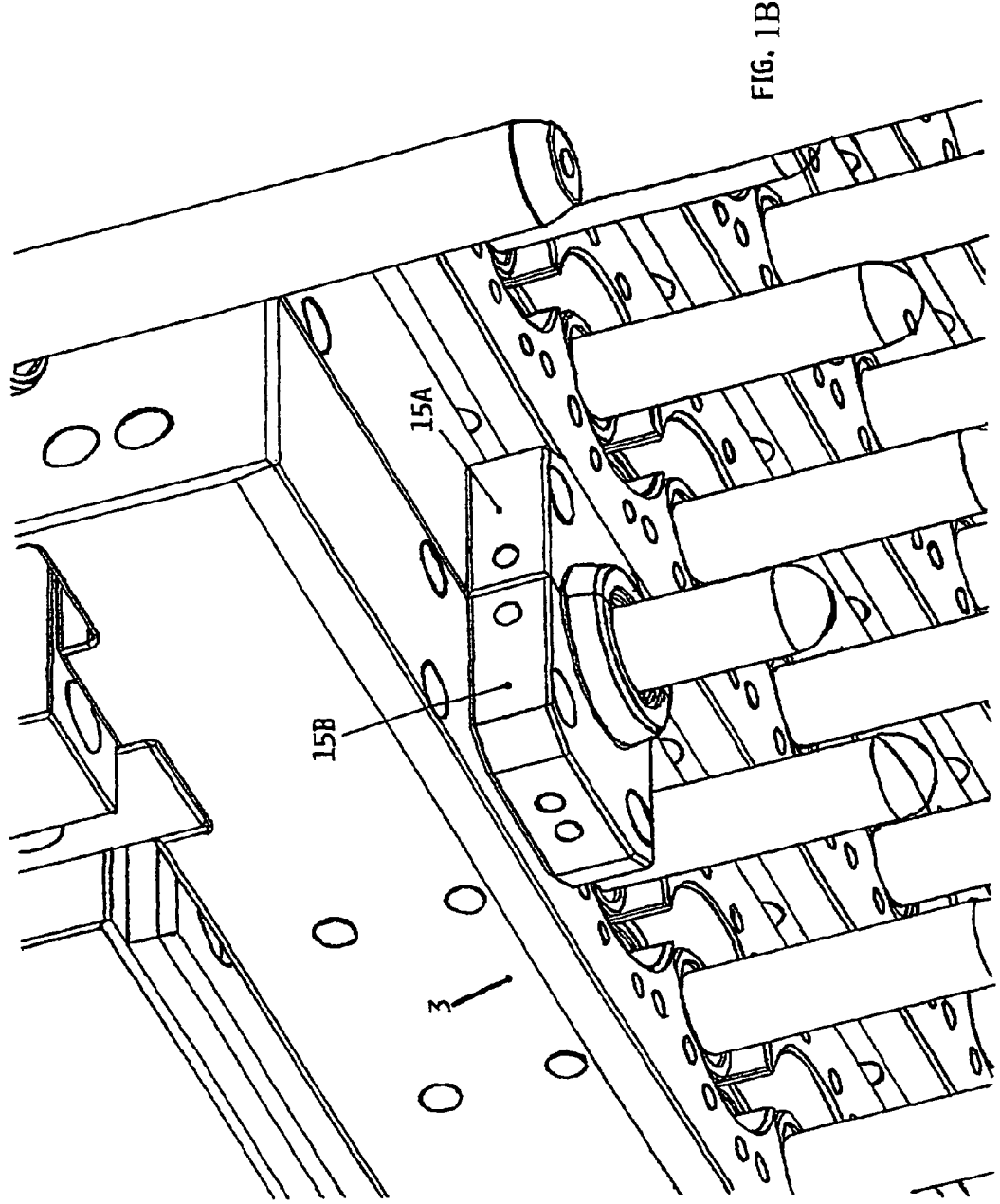

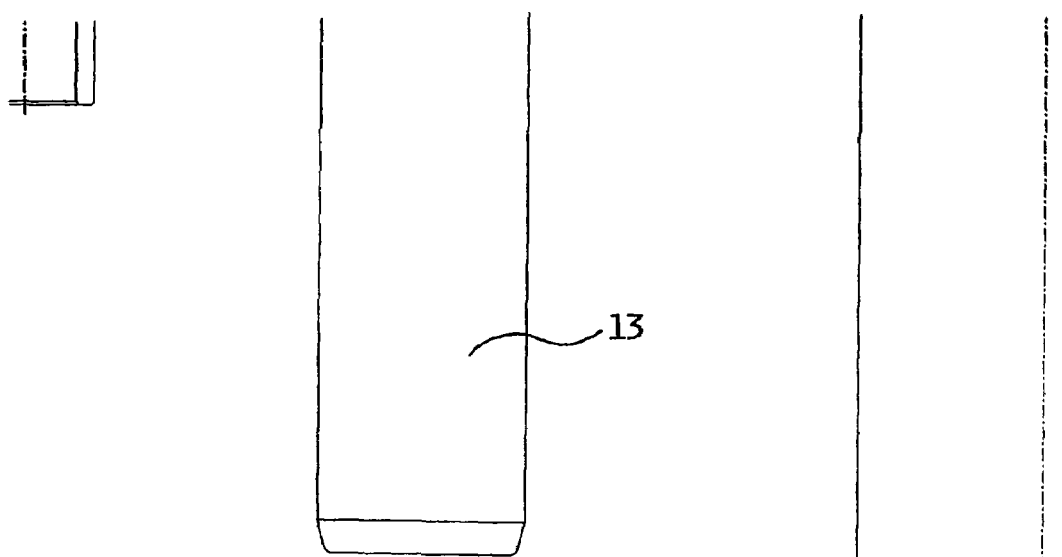
FIG.7
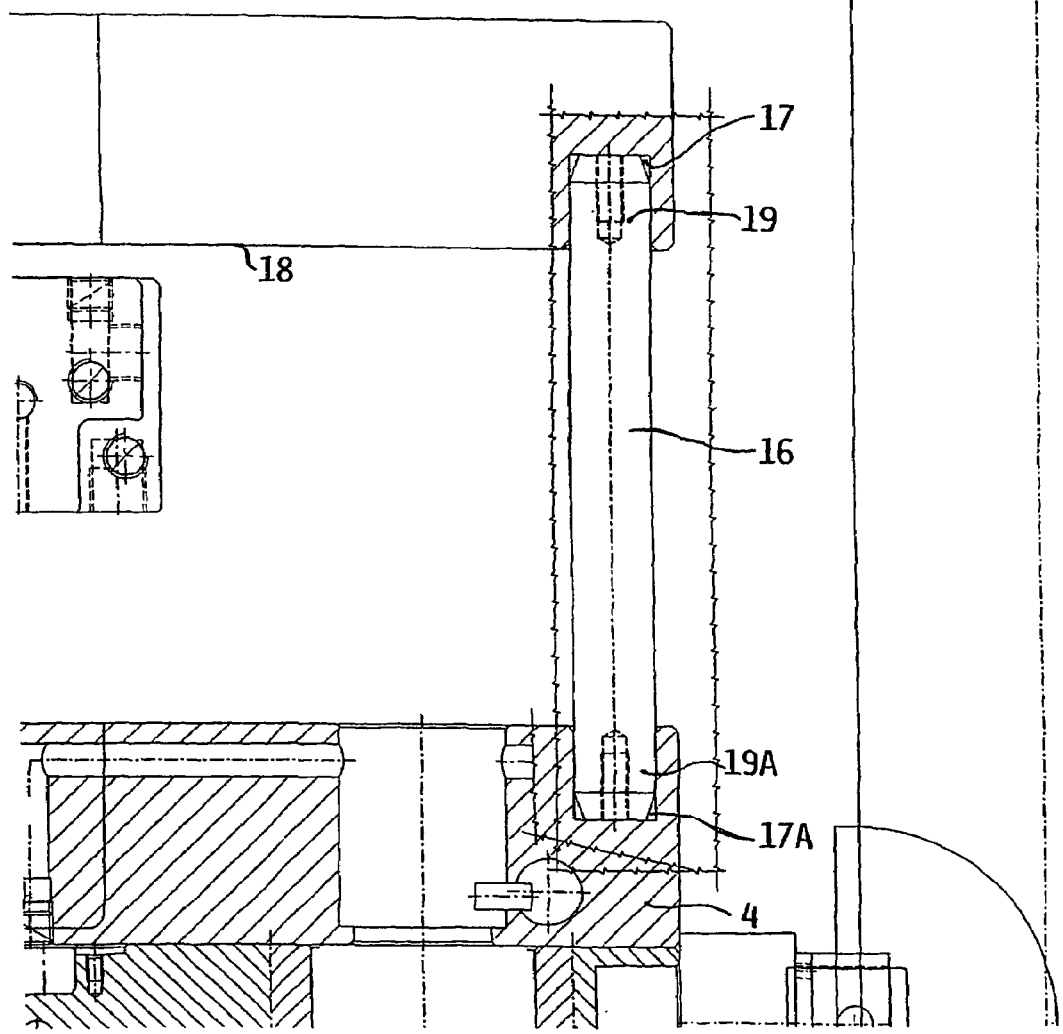

PLASTIC CONTAINER INJECTION-MOULDING MACHINE EQUIPPED WITH QUICK MOULD-CHANGE ARRANGEMENT

BACKGROUND OF THE INVENTION

The present invention refers to a specifically intended arrangement and a related utilization process, which are adapted to enable moulds to be changed in a very short time in injection moulding machines in which the half-moulds move in an either vertical or horizontal direction relative to each other.

In particular, the present invention applies in a preferred manner to machines adapted for moulding at the same time a plurality of plastic articles, ie. the so-called "preforms", are intended for subsequent processing by blow moulding into appropriate final containers, especially plastic bottles.

Although reference will be made in the following description, mainly for reasons of greater descriptive convenience, to a machine for moulding preforms of plastic material of the vertical-drive type, as this is used in combination with the preliminary steps of melting and extrusion of the plastic material, it will be appreciated that the present invention shall be understood as applying also to horizontal-drive injection moulding machines or even other kinds of uses or applications, as far as these fall within the scope of the appended claims.

It is generally known in the art that, during the preform moulding operation, use is generally made of a moulding machine comprising a stationary half-mould, which is firmly joined to the structure of the same machine, and a moving half-mould, which moves in a vertical direction and is selectively closable into an appropriate clamped position against said stationary half-mould.

With reference to FIGS. 1A, 1B, 2A, 2B and 2C, which illustrate the state of the art, the upper platen 1, whose particular features shall not be described here since they are already generally known in the art, is associated externally with a moving mould-carrying platen 2, which is in turn connected to the bar 3 that supports the lips 15. The task performed by these lips 15 is to form the neck of a respective bottle and, therefore, they are formed of two separable lip members 15a, 15b in consideration of the fact that, during the removal of the preform from the mould, the neck portion thereof shall be released from its own mould which is formed exactly by the lips. Due to the neck portion being actually provided with a number of undercut-like elements, a selected means for effectively releasing the neck portion from its own mould or lip 15 concerns in making it out of two separable members 15a and 15b, as illustrated in FIG. 7.

To the upper platen there are removably secured, through the use of appropriate fastening means, a plurality of male members 6. Furthermore, to this same upper platen 1 there are firmly associated, in a coaxial arrangement with respect to the male members, respective internal cooling tubes 7.

The mould is completed on the bottom by a cavity-carrying platen 4, in which there can be noticed a plurality of cavities 8 adapted to be filled with the material that is injected through respective nozzles 9.

The coupling of the upper platen 1 with the cavity-carrying platen 8 is brought about by means of a plurality of guide columns 13, which are firmly joined on top to the upper platen 1 and are adapted to slide into insertion in respective through-holes 10 appropriately provided in the cavity-carrying platen.

Furthermore, in view of ensuring the required alignments and the parallelism of the movements, even the moving platen 2 is provided with appropriate through-holes 11 adapted to be slidably engaged by the same guide columns 13.

During the practical operation of the injection moulding machine, it frequently occurs that such operational conditions arise as to make it necessary for access to be gained to the male members in order to replace and/or repair them. As it can most easily be inferred from the illustration in FIGS. 2A, 2B and 2C, when such a need arises for the male members 6 to be replaced and/or repaired, the first thing that must be done is to start by separating the moving mould-carrying platen 2 from the upper platen 1, in such a manner as to create a gap between those platens. Therefore, proper access can be gained manually to the fastening means so as to act on these so as to release and remove the male members 6.

Now, such an operation can actually be carried out in a quite easy and convenient manner if there are just a few (ie. not many) of the male members and these are further arranged in a single row. If on the contrary the male members are arranged in several rows, as illustrated in the Figures, then it becomes much more difficult and awkward for anyone to gain access to the male members due to the limited space that is available for such a purpose, so that the removal and re-assembly operation generally turns out to require a much longer time to be completed.

If the fact is finally taken into due account that, due to production-related or market-driven reasons, the need may actually arise for such male members to be replaced even as frequently as once a day, it can be readily appreciated how each such operation for the replacement of the male members, which may typically last as many as four hours, may on the whole turn out to be extremely expensive and time-wasting.

All these circumstances are largely known to all those skilled in the art, and are recalled here for the sole purpose of more effectively introducing and illustrating the technical context to which the present invention relates.

SUMMARY OF THE INVENTION

Based on the above considerations, it is therefore a main purpose of the present invention to provide an injection moulding machine which comprises the moving platen, the lip-carrying platen and the cavity-carrying platen, and is equipped with an arrangement that enables the cavity-carrying platen to be unclamped and moved away from the moving platen by such an extent as to allow access to be gained to the male members in a much more convenient and easy manner, so as to drastically cut down the time required to remove and subsequently re-assemble the male members.

The above arrangement shall furthermore be capable of being easily implemented using readily available and, therefore, cost-effective materials and techniques, and is further easy, reliable and safe to use.

Such an aim of the present invention, along with further features thereof, is reached in an injection moulding machine that is made and operates as recited in the appended claims.

BRIEF DESCRIPTION OF THE DRAWINGS

The present invention may take the form of a preferred, although not sole embodiment such as the one that is described in detail and illustrated below by way of non-limiting examples with reference to the accompanying drawings, in which:

FIG. 1B is an enlarged view, from a different perspective, of a detail of FIG. 1A;

FIG. 7 is an enlarged cross-sectional view of a portion of an injection moulding machine provided with an arrangement according to the present invention.

DETAILED DESCRIPTION OF THE INVENTION

Figure 1A:
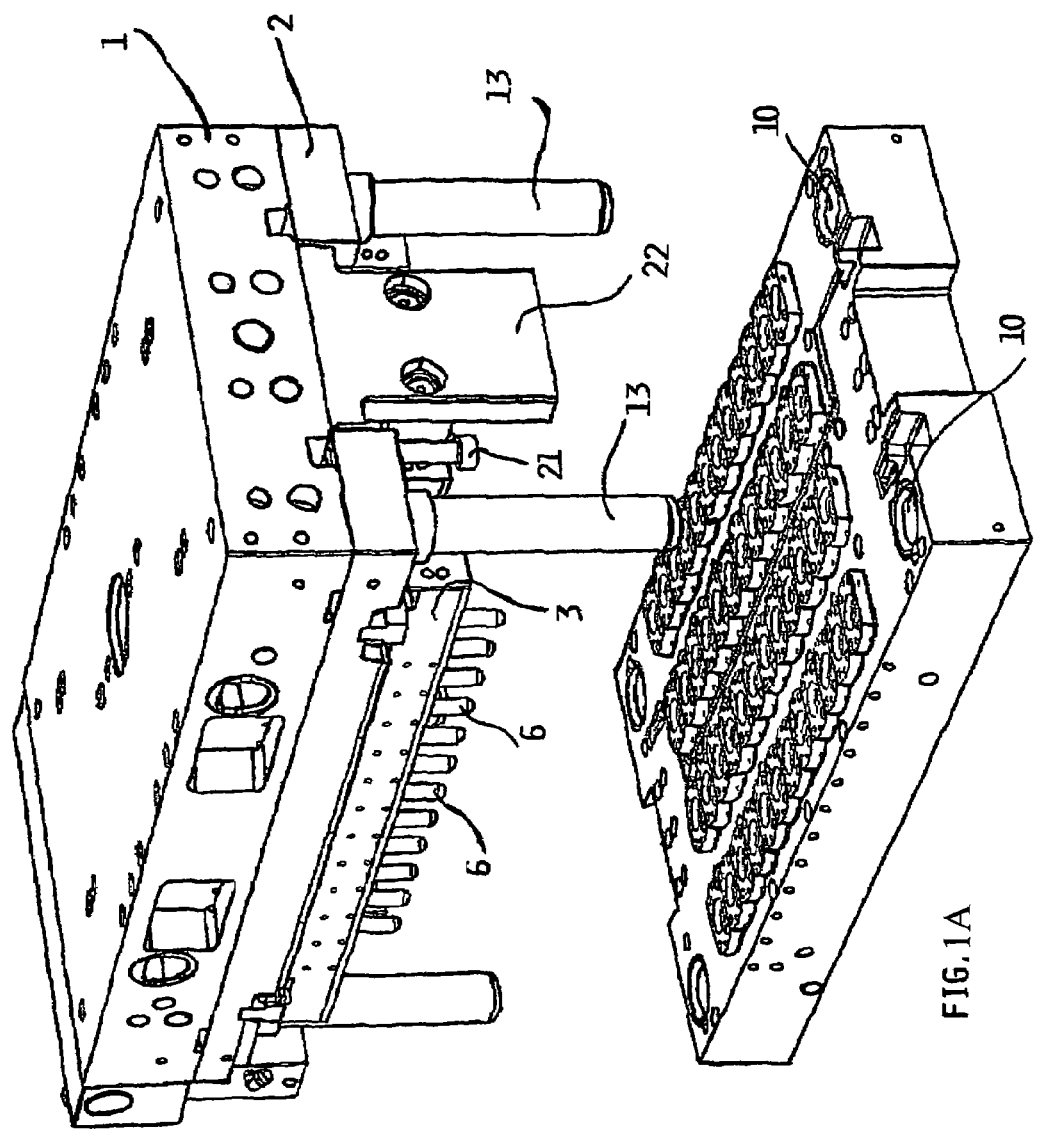
FIG. 1A is a perspective view of some basic parts of an injection moulding machine according to the state of the art, in a first operating state thereof.
Figure 2A:
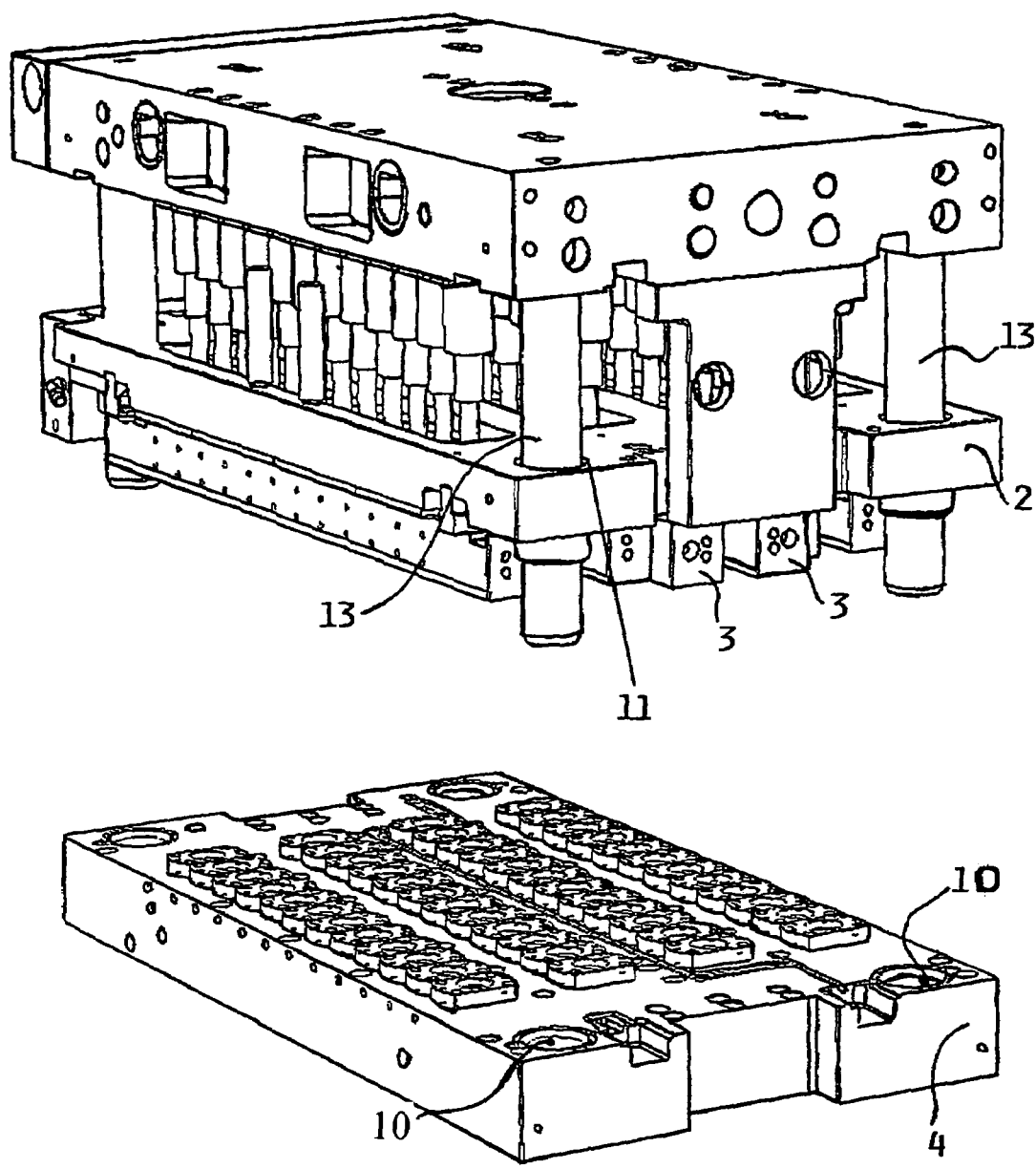
FIG. 2A is a perspective view of the same parts as the ones illustrated in FIG. 1A, however in a different operating state thereof.
Figure 2B:
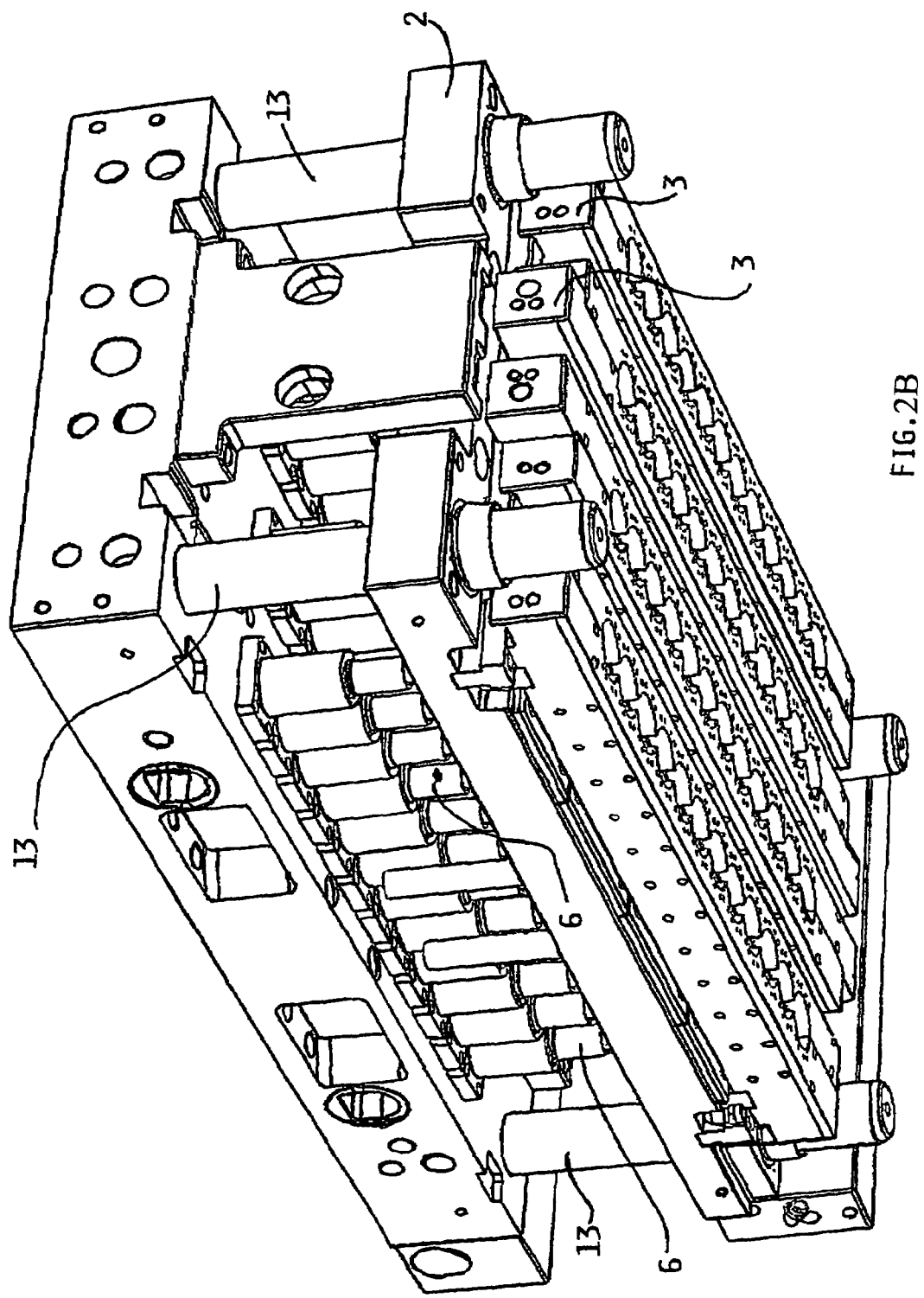
FIG. 2B is a perspective view of two of the machine parts illustrated in FIG. 2A, as seen from a different perspective point.
Figure 2C:
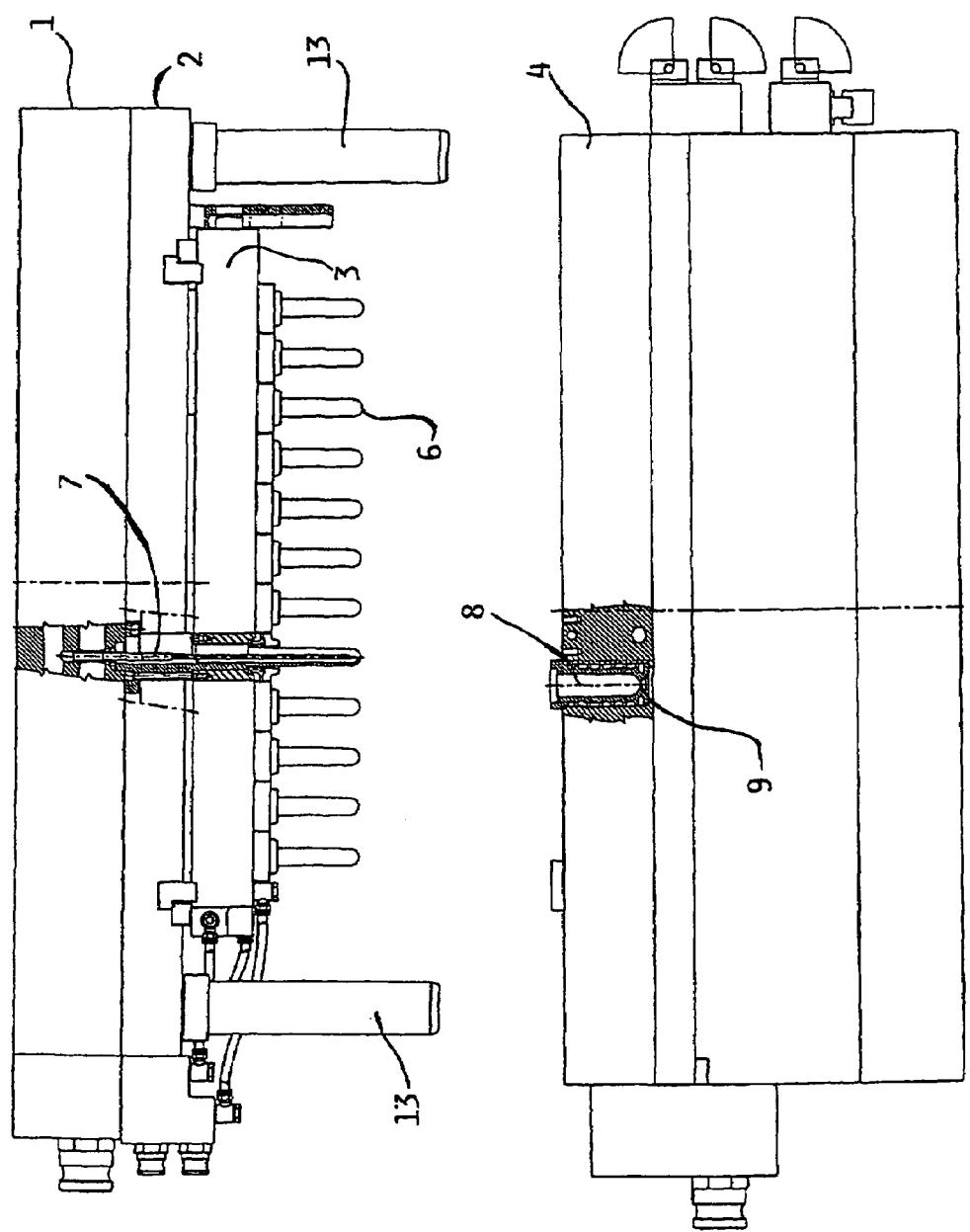
FIG. 2C is a vertical cross-sectional view (A—A) of the injection moulding machine illustrated in FIG. 1A.
Figure 3:
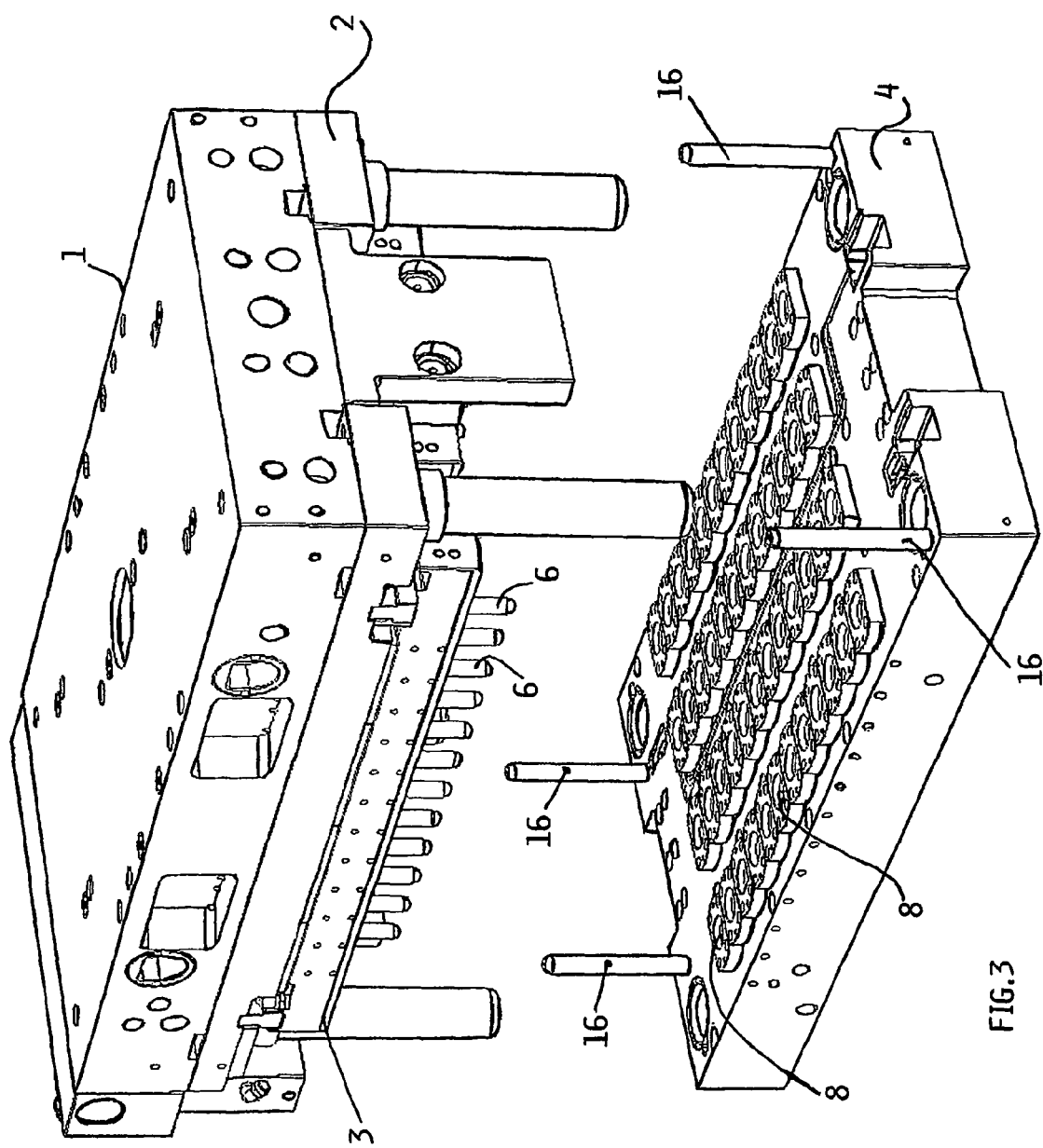
FIG. 3 is a perspective view of the same parts of the injection moulding machine illustrated in FIG. 1A, in which the machine is however provided with the arrangement according to the present invention.
Figure 4:
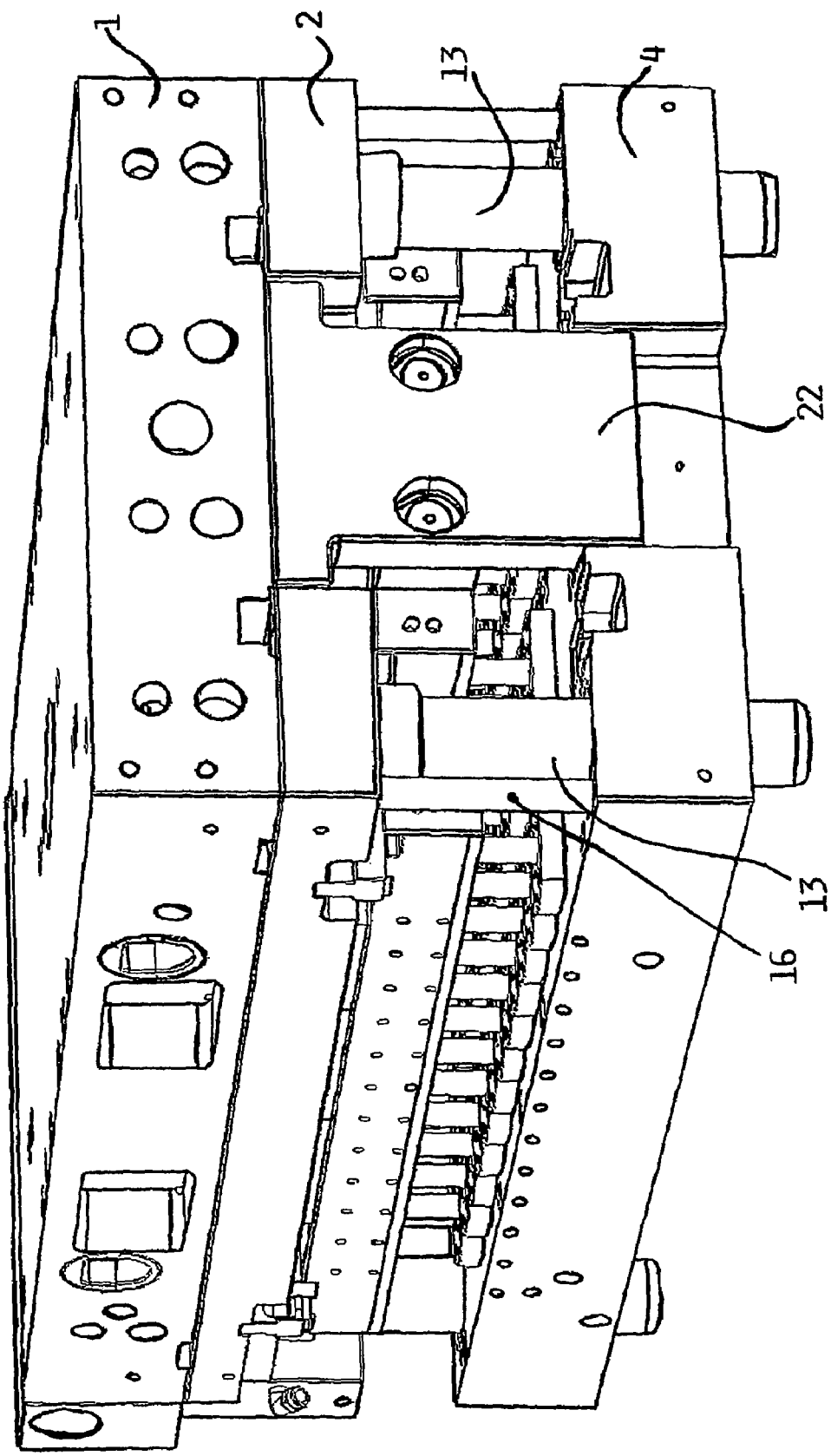
FIG. 4 is a perspective view of the same parts of the injection moulding machine illustrated in FIG. 3, in which the various parts thereof are however coupled with each other in a first operating phase according to the present invention.
Figure 5A:
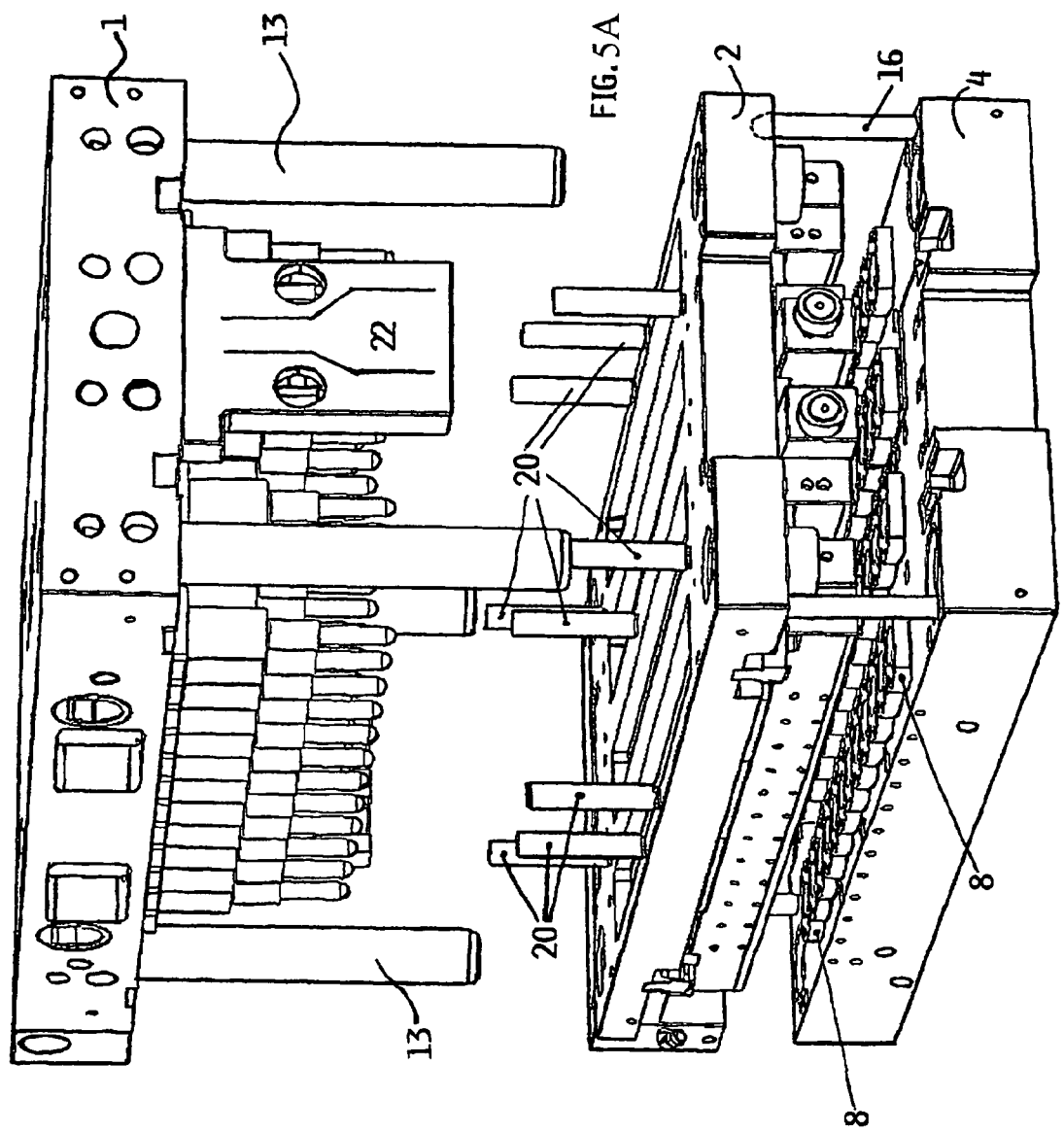
FIG. 5A is a perspective view of the same parts of the injection moulding machine illustrated in FIG. 4, in which they are however arranged in a second operating phase according to the present invention.
Figure 5B:
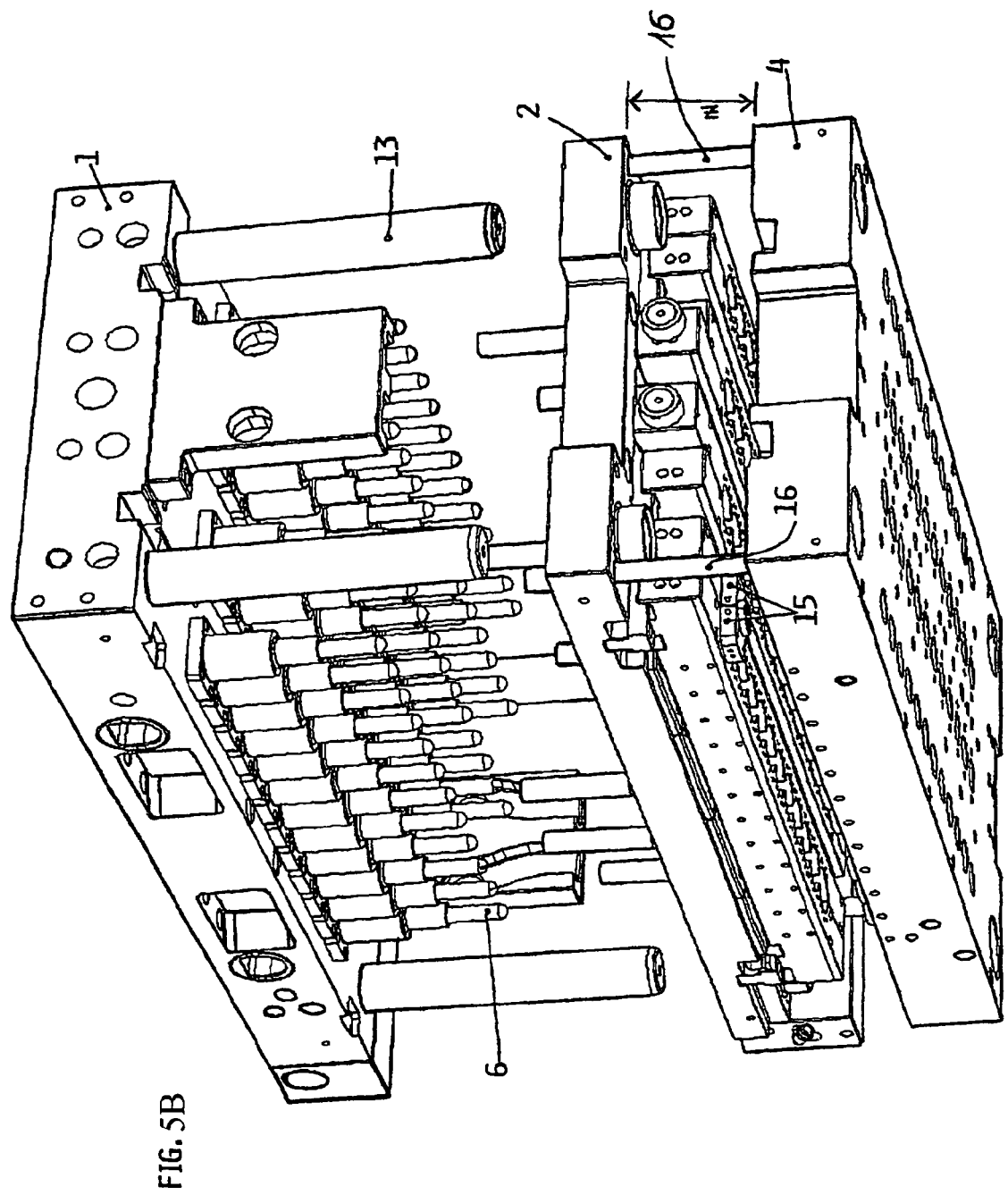
FIG. 5B is a different perspective view of the same parts of the injection moulding machine illustrated in FIG. 5A.
Figure 6:
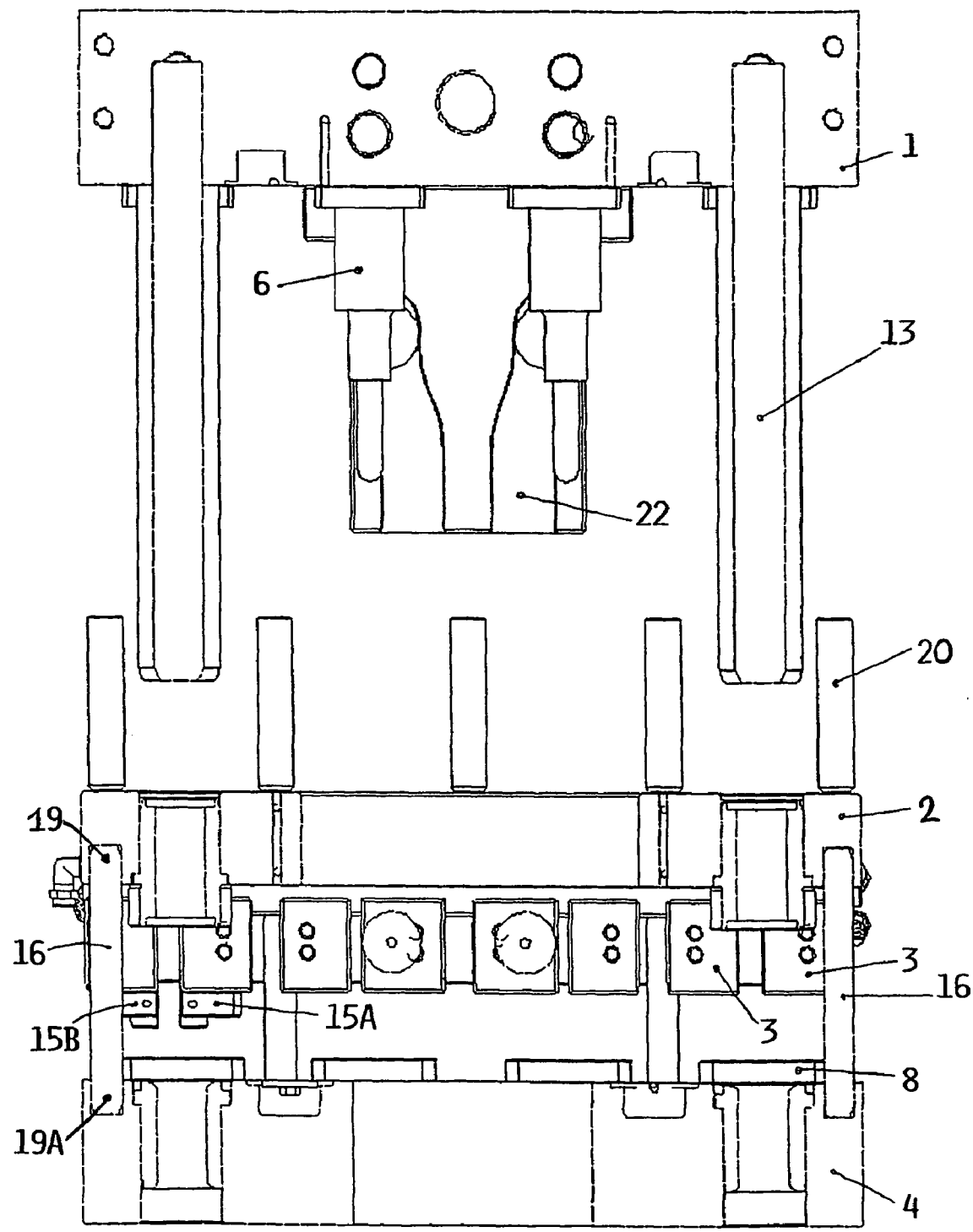
FIG. 6 is a side view, along the direction "B", of the injection moulding machine illustrated in FIG. 5B.

With reference to the above listed Figures, a vertical-drive type of injection moulding machine provided with an upper half-mould adapted to produce preforms of plastic material comprises an upper platen 1, a moving platen 2, and a plurality of lips, or neck-rings as they are also called in the art. The lips are the mould portions that are intended to form the neck portion of the preform during the injection of the thermoplastic resin, and are formed by two respective separable members 15a and 15b. A support bar 3 carries the plurality of lips, and a plurality of male members 6 are secured at their bottom or foot portion to the upper platen 1 by an appropriate fastening means as they are commonly known and used in the art.

Furthermore, inside the male members there are preferably provided respective cooling tubes 7, whose task and structure are generally known in the art, and which are applied on to the lower face of the upper platen 1.

The injection moulding machine further comprises a cavity-carrying platen 4, in which there are provided a plurality of cavities 8 associated with respective gates or nozzles 9 through which the molten resin is actually injected.

The described injection moulding machine is provided also with a plurality of guide columns 13, which are firmly joined on top to the upper platen 1 and are adapted to slidably move into respective appropriate through-holes 10 provided in the cavity-carrying platen and into respective appropriate through-holes 11 provided in the moving mould-carrying platen 2.

The task assigned to the guide columns and the through-holes is to ensure correct alignment of the upper platen, the moving mould-carrying platen, and the cavity-carrying platen with respect to each other when they move with respect to each other. On the other hand, these parts are solely illustrated by way of more effective, thorough exemplification, although not strictly necessary to the purposes of the present invention and are not anyway a part thereof.

It is largely known that, according to prior-art solutions, in order to replace the male members in an injection moulding machine of the type described here by way of example, a procedure is usually followed including, among other things, the steps of:

releasing the safety pins 21 and clearing the knock-out pins 20;

raising the upper platen up to the highest opening position allowed for by the injection moulding machine itself;

separating the moving platen from the upper platen and lowering it down to a level corresponding to the downward stroke or travel covered to clamp (ie., close) the mould and limited by the length of the columns or pins.

As this has already been said earlier in this description, in such a state of the injection moulding machine it is certainly possible for the male members to be reached for their removal. Under certain circumstances, however, this may well turn out to be quite awkward and complicated.

The presence of the cooling tubes inserted in the male members, and which anyhow remain in their position inside the male members, needs to be furthermore taken into due account, since it becomes necessary for the male members to be appropriately lowered so as to be able to slip them off downwards from the respective attachments in the upper platen. In other words, this is an operation that makes it still more complicated, awkward and demanding to disengage and subsequently re-assemble the male members.

In view of doing away with such a drawback, the present invention consists in enabling the moving platen 2 to be lowered down to well beyond the usual level, without the constraint of having to retain it anyway engaged to the guide columns 13. As a matter of fact, the ability of lowering the moving platen to a significantly greater extent would enable the gap that is so obtained between the upper platen, which maintains its raised position, and the moving platen 2 to be increased accordingly.

According to the present invention, such a greater extent of lowering is obtained by providing an appropriate removable member between the moving platen and the cavity-carrying platen 4, wherein the task assigned to the removable member lies in constituting appropriate resting means for the moving mould-carrying platen which can in this way be fully disengaged from the upper platen 1.

The need for the utilization of the resting means and an adequately large separation of the moving platen from the cavity-carrying platen 4 depends on the circumstance that there is provided a cam-operated mechanism 22 which, when the upper platen 1 is raised or, when the upper platen 1 is moved apart from the moving platen, automatically provides for the two portions 15a and 15b forming the lips to be separated and widened out. Now, if the portions are widened out (in order to allow for the neck portion of the preform to be knocked out), it would be practically impossible to simply bring the moving platen 2 to a rest on the cavity-carrying platen 4, since the lip portions 15a and 15b would interfere violently against the upper edge of the respective cavities, thereby getting damaged and/or damaging the cavities themselves.

An obvious solution lies therefore in providing an appropriate removable member between the platens in such a manner as to adequately move and keep the platens apart from each other at a desired distance "Z" that is effective in doing away with the above described drawback.

In a preferred manner, the removable member is constituted by a multiplicity of resting cylinders 16, or parallelepipeds, arranged parallel to each other and having the same height, the axis of which is parallel to the direction of movement of the moving mould-carrying platen, as this is illustrated in the Figures.

With reference to FIG. 7, it furthermore turns out to be of particular advantage if the removable member is applied to rest upon the cavity-carrying platen 4. In view of a safer, more reliable engagement and centering of the member (cylinders) 16 with and relative to the moving platen 2 when the mould is clamped into its closed position, the moving platen 2 itself is provided, in correspondence of the resting zones of the lower surface 18 thereof, with appropriate recessed seats 17 adapted to be coupled with an upper portion 19 of a respective removable member (cylinders). One of ordinary skill in the art would readily recognize that the removable member is to be used as described above to separate the movable platen and the lower cavity-carrying platen when the injection machine is not in operation.

Similarly, the cavity-carrying platen 4 is provided, on the upper surface thereof, with corresponding recessed seats 17A adapted to be coupled with the lower portions 19A of respective removable means (cylinders).

Those skilled in the art will at this point be fully capable of seeing clearly into the method involved in the implementation and utilization of the present invention. Such a method can be shortly set forth as including the steps of:

separating a moving mould-carrying platen 2, associated to and joined with a respective upper platen 1, from the lower cavity-carrying platen;

placing the removable member (cylinders) 16 between the moving mould-carrying platen 2 and the cavity-carrying platen, by preferably using the recessed seats 17 and 17A for this purpose;

lowering the moving platen 2 towards the cavity-carrying platen 4 down to the point at which the moving platen 2 eventually comes to rest upon the removable member;

separating and raising the upper platen 1 from the moving mould-carrying platen 2, which remains resting on the removable member 16.

The invention claimed is:

1. An injection moulding machine for forming preforms, comprising:
   an upper platen;
   a moving platen operable to be moved relative to said upper platen, said moving platen having through-holes;
   a support bar connected to said moving platen and carrying a plurality of lips, each of said lips comprising a pair of separable members;
   a plurality of male members connected to said upper platen by fastening means;
   cooling tubes inserted into said male members;
   a lower cavity-carrying platen having a plurality of cavities corresponding to respective nozzles, said lower cavity-carrying platen having through-holes;
   a plurality of guide columns fixed to and extending from said upper platen so as to be slidably insertable into said through-holes in said moving platen and into said through-holes in said lower cavity-carrying platen, said guide columns being completely disengageable from said moving platen and said lower cavity-carrying platen; and
   a removable member to be arranged between said moving platen and said lower cavity-carrying platen so as to position said moving platen with respect to said lower cavity-carrying platen and maintain a pre-selected distance between said moving platen and said cavity-carrying platen.

2. The injection moulding machine of claim 1, wherein said guide columns are completely disengageable from said moving platen and said lower cavity-carrying platen and said removable member is operable to be arranged between said moving platen and said lower cavity-carrying platen when said injection moulding machine is not in operation.

3. The injection moulding machine of claim 1, wherein said removable member comprises a plurality of resting cylinders arranged parallel to each other and having the same height, a longitudinal axis of each of said resting cylinders being parallel to a direction of movement of said moving platen.

4. The injection moulding machine of claim 3, wherein said resting cylinders are shaped so as to rest upon said lower cavity-carrying platen.

5. The injection moulding machine of claim 3, wherein said moving platen has recessed seats on a lower surface thereof for coupling to an upper portion of said resting cylinders, and said lower cavity-carrying platen has recessed seats on an upper surface thereof corresponding to said recessed seats of said moving platen for coupling to a lower portion of said resting cylinders.

6. The injection moulding machine of claim 3, wherein said resting cylinders comprise a plurality of separate, non-axially arranged cylinders spaced apart between an upper surface of said lower cavity-carrying platen and a lower surface of said moving platen.

7. The injection moulding machine of claim 1, wherein said removable member comprises a plurality of separate, parallel, and non-axially arranged resting cylinders spaced apart between an upper surface of said lower cavity-carrying platen and a lower surface of said moving platen.

8. The injection moulding machine of claim 1, wherein said removable member is shaped so as to rest upon said lower cavity-carrying platen.

9. The injection moulding machine of claim 1, wherein said moving platen has recessed seats on a lower surface thereof for coupling to an upper portion of said removable member, and said lower cavity-carrying platen has recessed seats on an upper surface thereof corresponding to said recessed seats of said moving platen for coupling to a lower portion of said removable member.

10. A method of removing and re-assembling male members in an injection moulding machine, comprising:
    separating a moving platen, joined with an upper platen, from a lower cavity-carrying platen, the injection moulding machine having guide members fixed to and extending from the upper platen and slidably inserted into through-holes in the moving platen and into through-holes in the lower cavity-carrying platen so as to engage the moving platen and the lower cavity-carrying platen;
    positioning a removable member between the moving platen and the lower cavity-carrying platen so as to limit travel of the moving platen towards the lower cavity-carrying platen, and so that the moving platen can be positioned a pre-selected distance from the lower cavity-carrying platen;

lowering the moving platen towards the lower cavity-carrying platen to a position corresponding to the pre-selected distance so that the moving platen comes to rest upon the removable member; and separating and raising the upper platen from the moving platen so that the moving platen remains resting on the removable member, and so that the guide columns are completely disengaged from the moving platen and the lower cavity-carrying platen.

11. The method of claim 10, wherein said positioning of the removable member is conducted when the injection moulding machine is not in operation.

12. The method of claim 10, wherein said positioning of the removable member comprises positioning a removable member including a plurality of resting cylinders arranged parallel to each other and having the same height, a longitudinal axis of each of the resting cylinders being parallel to a direction of movement of the moving platen.

13. The method of claim 12, wherein the lower cavity-carrying platen has recessed seats in an upper surface thereof, said positioning of the removable member comprises arranging the resting cylinders so that a lower portion of each of the resting cylinders is coupled to a respective one of the recessed seats in the upper surface of the lower cavity-carrying platen, and wherein the moving platen has recessed seats in a lower surface thereof, said lowering of the moving platen comprising lowering the moving platen so that an upper portion of each of the resting cylinders is coupled to a respective one of the recessed seats in the lower surface of the moving platen.

* * * * *